United States Patent Office 3,220,982
Patented Nov. 30, 1965

3,220,982
PREPARATION OF SPINNABLE POLYESTERS USING THALLIUM CATALYSTS
Ram Advani, Frankfurt am Main, Germany, assignor to Firma Hans J. Zimmer Verfahrenstechnik, Frankfurt am Main, Germany
No Drawing. Filed Aug. 23, 1962, Ser. No. 218,855
Claims priority, application Germany, Aug. 31, 1961, Z 8,944
5 Claims. (Cl. 260—75)

This invention relates to a process for the production of spinnable polyesters in the presence of thallium compounds as transesterification and polycondensation catalysts.

It is known that, in commercial production of spinnable polyesters of polyethylene glycol terephthalate, catalysts are used for the transesterification of dimethyl terephthalate to form diethylene glycol terephthalate and for the subsequent polycondensation of diethylene glycol terephthalate. A number of patents disclose the use of various catalysts or catalyst combinations of two or more constituents to be used for transesterification and/or polycondensation. Thus, the processes of British Patent No. 727,790 and of U.S. Patents Nos. 2,892,815, 2,641,592 and 2,857,363 use metal salts such as Zn, Pb, Ca, Cd, Co, Sn and Ba formates, acetates or acetonyl acetonates alone or in mixture. These catalysts are used in both the transesterification and polycondensation.

However, a number of patents such as U.S. Patent 2,647,885 and British Patents 588,833, 588,834, 740,531, and 773,778 recommend the addition of co-catalysts such as $Sb_2O_3$ or inorganic or organic $P^{III}$ derivatives to the polycondensation.

It has now been found that thallium compounds which are soluble in the starting products, i.e. in the dimethyl terephthalate melt, in the glycol or in the mixture thereof, can be used advantageously as catalysts in the production of spinnable polyesters of polyethylene glycol terephthalate. Inorganic or organic thallium compounds of this kind such as, for example, Thallium-I-carbonate,
Thallium-III-chloride, or
Thallium-I-acetate, formate, oxalate or malonate, can be used with advantage as catalysts for the transesterification and also for the subsequent polycondensation of the resultant diethylene glycol terephthalate to form polyethylene glycol terephthalate.

The particular advantage of the use of such thallium compounds resides primarily in the low sensitivity of the catalysts to oxygen. The transesterification and polycondensation may be carried out at elevated temperature, but without the use of the otherwise usual protective gas atmosphere.

The catalysts described have a favorable effect on thermal stability and photochemical resistance of the spinnable polyester produced. The resultant colorless, water-white melt which solidifies to form a milk-white mass or from which clear, white fibers can be drawn shows only minor changes of shade or of the mechanical characteristics even in case of extended exposure to elevated temperatures, e.g. when heated for 200 hours at 150° C. or in case of short-time thermal treatment at temperatures up to 270–290° C. or extended exposure to UV radiation. Thus, the use of catalysts of this kind does not only offer increased safety in operation when producing the polymers but also advantages with respect to the application of the polymers due to the increased thermal stability and resistance to light.

The following examples of applicabilities of the thallium compounds described above are given by way of illustration and not limitation.

Example 1

1 mole of dimethyl terephthalate is transesterified with 2.0 to 3.0 moles of glycol in the presence of 0.01 to 0.1%, based on dimethyl terephthalate, of thallium-I-acetate at temperatures of 190 to 240° C. and preferably of 210 to 220° C. and the excess glycol is removed. Then the temperature is gradually increased to 280° C. and the pressure reduced to 0.1 to 5 mm. Hg. A polymer having an intrinsic viscosity of 0.5 to 0.8 at 20° C., measured in a 0.5% phenol-tetrachloroethane solution, is obtained after a polycondensation period of 3 to 6 hours.

Example 2

The transesterification and polycondensation are carried out by the procedure described in Example 1 except that 0.01 to 0.1% of thallium-I-carbonate is substituted for thallium-I-acetate.

What is claimed is:
1. In a process for producing spinnable polyesters by transesterification of dimethyl terephthalate with ethylene glycol to form the ethylene glycol diester of terephthalic acid followed by polycondensation of said ethylene glycol diester of terephthalic acid, the improvement which comprises reacting said dimethyl terephthalate with ethylene glycol in the presence of a catalytic amount of a thallium compound soluble in at least one of said dimethyl terephthalate and ethylene glycol.
2. A method according to claim 1, wherein said thallium compound is employed in an amount of from 0.01 to 0.1%.
3. A method according to claim 1, wherein said thallium compound is a member selected from the group consisting of thallium-I-carbonate,
thallium-III-chloride,
thallium-I-acetate,
thallium-I-formate,
thallium-I-oxalate, and
thallium-I-malonate.

4. A method according to claim 1, wherein said thallium compound is thallium-I-acetate.
5. A method according to claim 1, wherein said thallium compound is thallium-I-carbonate.

References Cited by the Examiner
UNITED STATES PATENTS
2,465,319   3/1949   Whinfield _____ 260—75
3,113,125   12/1963  Grantham _____ 260—75

FOREIGN PATENTS
893,304   4/1962   Great Britain.

OTHER REFERENCES
Journal of Chemical Society (London), 1957, pp. 1775–81, article by Hoppe et al.

WILLIAM H. SHORT, Primary Examiner.
LOUISE P. QUAST, Examiner.